(12) United States Patent
Zhang

(10) Patent No.: US 11,175,534 B1
(45) Date of Patent: Nov. 16, 2021

(54) LIQUID CRYSTAL DISPLAY MODULE, DISPLAY DEVICE, AND FABRICATING METHOD THEREOF

(71) Applicant: HUIZHOU CHINA STAR OPTOELECTRONICS TECHNOLOGY CO., LTD., Huizhou (CN)

(72) Inventor: Yanxue Zhang, Huizhou (CN)

( * ) Notice: Subject to any disclaimer, the term of this patent is extended or adjusted under 35 U.S.C. 154(b) by 238 days.

(21) Appl. No.: 16/618,372

(22) PCT Filed: Sep. 11, 2019

(86) PCT No.: PCT/CN2019/105299
§ 371 (c)(1),
(2) Date: Dec. 1, 2019

(87) PCT Pub. No.: WO2020/232918
PCT Pub. Date: Nov. 26, 2020

(30) Foreign Application Priority Data

May 22, 2019 (CN) .......................... 201910426963.0

(51) Int. Cl.
*G02F 1/1333* (2006.01)
*G02F 1/1335* (2006.01)
*G02F 1/13357* (2006.01)

(52) U.S. Cl.
CPC .. *G02F 1/133607* (2021.01); *G02F 1/133514* (2013.01); *G02F 1/133608* (2013.01); *G02F 1/133611* (2013.01)

(58) Field of Classification Search
CPC .......... B02F 1/133607; B02F 1/133608; B02F 1/133611; B02F 1/133514
USPC .......................................................... 349/56
See application file for complete search history.

(56) References Cited

U.S. PATENT DOCUMENTS

| | | | |
|---|---|---|---|
| 9,864,477 B2* | 1/2018 | Ryu | H01L 27/323 |
| 9,989,790 B2* | 6/2018 | Yang | G02F 1/133305 |
| 10,054,988 B2* | 8/2018 | Jin | G06F 1/1643 |
| 2013/0002572 A1 | 1/2013 | Jin et al. | |
| 2013/0002583 A1* | 1/2013 | Jin | G06F 3/041 |
| | | | 345/173 |
| 2014/0183473 A1 | 7/2014 | Lee et al. | |
| 2017/0045677 A1 | 2/2017 | Zhou | |
| 2017/0150617 A1* | 5/2017 | Jeong | G02F 1/1333 |
| 2018/0357941 A1 | 12/2018 | Yongxin et al. | |
| 2020/0064676 A1 | 2/2020 | Liang | |
| 2020/0103940 A1 | 4/2020 | Jin et al. | |

FOREIGN PATENT DOCUMENTS

| | | |
|---|---|---|
| CN | 102855822 A | 1/2013 |
| CN | 104848083 A | 8/2015 |
| CN | 104965330 A | 10/2015 |

(Continued)

*Primary Examiner* — Christopher M Raabe

(57) ABSTRACT

A liquid crystal display module, a display device, and a fabricating method thereof are provided. The liquid crystal display module has: a first substrate having a first display portion and a first bending portion; a second substrate having a second display portion, a second bending portion, and a binding portion, wherein an edge of the binding portion exceeds an edge of the first bending portion; a packaging unit; a first circuit board connected to the binding portion by the package unit; and the backlight module.

15 Claims, 4 Drawing Sheets

(56) References Cited

FOREIGN PATENT DOCUMENTS

| CN | 106887187 A | 6/2017 |
|---|---|---|
| CN | 109445158 A | 3/2019 |
| CN | 208752348 U | 4/2019 |

* cited by examiner

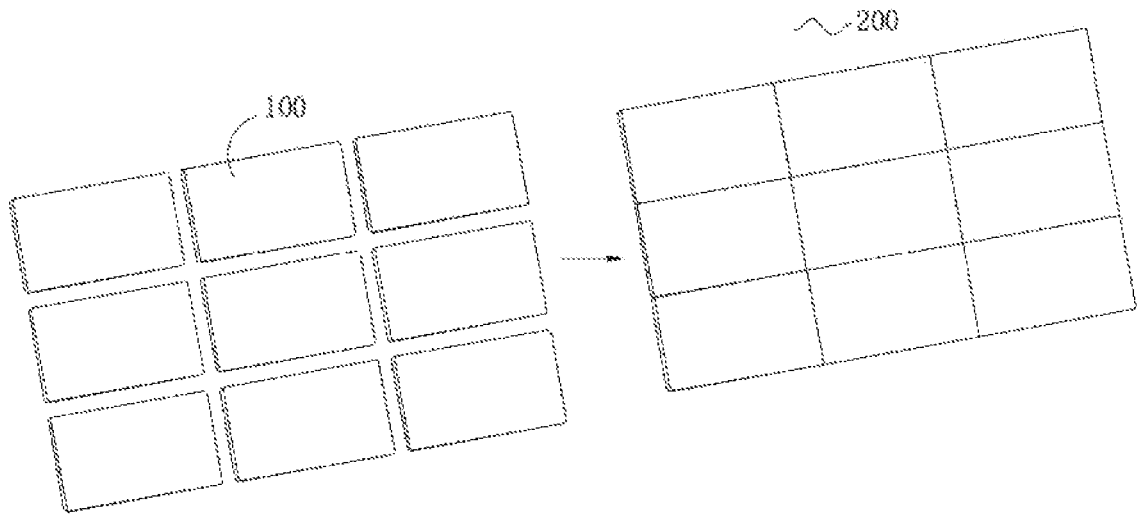

FIG. 5

```
┌─────────────────────────────────────────┐
│ Providing a liquid crystal display      │
│ module comprising a first substrate, a  │
│ second substrate, and a backlight       │
│ module, wherein the first substrate     │──S10
│ comprises a first display portion and a │
│ first bending portion, and the second   │
│ substrate comprises a second display    │
│ portion, a second bending portion, and  │
│ a binding portion                       │
└─────────────────────────────────────────┘
                    │
                    ▼
┌─────────────────────────────────────────┐
│ Connecting the first circuit board with │──S20
│ the binding portion by a packaging unit │
└─────────────────────────────────────────┘
                    │
                    ▼
┌─────────────────────────────────────────┐
│ Bending the first bending portion, the  │
│ second bending portion, and the binding │
│ portion toward a direction of the       │
│ backlight module, and extending the     │
│ first bending portion, the second       │──S30
│ bending portion, and the binding        │
│ portion to the backlight module,        │
│ wherein the first circuit board is bent │
│ into a receiving space formed by the    │
│ middle frame and the outer frame of the │
│ backlight module                        │
└─────────────────────────────────────────┘
```

FIG. 6

LIQUID CRYSTAL DISPLAY MODULE, DISPLAY DEVICE, AND FABRICATING METHOD THEREOF

FIELD OF DISCLOSURE

The present disclosure relates to displays, and more particularly to a liquid crystal display module, a display device, and a fabricating method thereof.

BACKGROUND OF DISCLOSURE

Liquid crystal displays (LCD) have many advantages such as thin body, power saving, and no radiation, and have been widely used. With rapid development of liquid crystal display technologies and people's requirements for quality of liquid crystal displays continuing to increase, people have higher and higher requirements on a display region ratio of the liquid crystal displays. Therefore, large screens and narrow frames have become an important direction for product technology development.

In conventional liquid crystal display technologies, a periphery of the display portion of the liquid crystal display device often has a frame portion that does not perform a display function, and the portion is provided with a plurality of circuits and circuit lines to provide corresponding driving signals for the pixel units of the display portion. In order to meet setting of the corresponding circuit and circuit lines, the frame portion tends to occupy a large proportion, which is contrary to a relatively great display area ratio that people are pursuing, and cannot meet a user's needs.

In summary, the existing liquid crystal display devices have a problem that the screen occupation is relatively low. Therefore, it is necessary to provide a liquid crystal display module, a display device, and a fabricating method thereof to improve this defect.

SUMMARY OF DISCLOSURE

In conventional liquid crystal display technologies, a periphery of the display portion of the liquid crystal display device often has a frame portion that does not perform a display function, and the portion is provided with a plurality of circuits and circuit lines to provide corresponding driving signals for the pixel units of the display portion. In order to meet setting of the corresponding circuit and circuit lines, the frame portion tends to occupy a large proportion, which is contrary to a relatively great display area ratio that people are pursuing, and cannot meet a user's needs. In summary, the existing liquid crystal display devices have a problem that the screen occupation is relatively low.

An embodiment of the present disclosure provides a liquid crystal display module, a display device, and a fabricating method thereof, so as to solve the problem that a screen ratio of the existing liquid crystal display devices is relatively low.

An embodiment of the present disclosure provides a liquid crystal module, comprising:
- a first substrate comprising a first display portion and a first bending portion disposed around the first display portion;
- a second substrate comprising a second display portion, a second bending portion disposed around the second display portion, and a binding portion disposed on a side of the second bending portion away from the second display portion, wherein an edge of the binding portion exceeds an edge of the first bending portion;
- a packaging unit;
- a first circuit board connected to the binding portion by the packaging unit; and
- a backlight module,
- wherein the first bending portion, the second bending portion, and the binding portion are bent toward a direction of the backlight module and extend to the backlight module.

According to an embodiment of the present disclosure, the backlight module comprises a middle frame and an outer frame, wherein the middle frame and the outer frame form a receiving space, and the first circuit board is bent into the receiving space.

According to an embodiment of the present disclosure, the backlight module further comprises a diffusion sheet, a prism sheet, and a brightness enhancement film, wherein the brightness enhancement film is disposed on a side of the diffusion sheet adjacent to the second substrate, and the prism sheet is disposed between the diffusion sheet and the brightness enhancement film.

According to an embodiment of the present disclosure, the backlight module further comprises an adhesive, and the diffusion sheet, the prism sheet, and the brightness enhancement film constitute an optical film set, wherein the optical film set is fixed to the binding portion or a side of the second bending portion away from the first bending portion by the adhesive.

According to an embodiment of the present disclosure, the backlight module further comprises a second circuit board and a plurality of light sources, and the second circuit board is disposed at a side of a bottom of the middle frame adjacent to the second substrate, wherein the plurality of light sources are disposed on the second circuit board with intervals.

According to an embodiment of the present disclosure, the first substrate is a color filter substrate, and the second substrate is an array substrate.

An embodiment of the present disclosure provides a display device comprising: a liquid crystal display module comprising:
- a first substrate comprising a first display portion and a first bending portion disposed around the first display portion;
- a second substrate comprising a second display portion, a second bending portion disposed around the second display portion, and a binding portion disposed on a side of the second bending portion away from the second display portion, wherein an edge of the binding portion exceeds an edge of the first bending portion;
- a packaging unit;
- a first circuit board connected to the binding portion by the packaging unit; and
- a backlight module,
- wherein the first bending portion, the second bending portion, and the binding portion are bent toward a direction of the backlight module and extend to the backlight module.

According to an embodiment of the present disclosure, the backlight module comprises a middle frame and an outer frame, wherein the middle frame and the outer frame form a receiving space, and the first circuit board is bent into the receiving space.

According to an embodiment of the present disclosure, the backlight module further comprises a diffusion sheet, a prism sheet, and a brightness enhancement film, wherein the brightness enhancement film is disposed on a side of the diffusion sheet adjacent to the second substrate, and the prism sheet is disposed between the diffusion sheet and the brightness enhancement film.

According to an embodiment of the present disclosure, the backlight module further comprises an adhesive, and the diffusion sheet, the prism sheet, and the brightness enhancement film constitute an optical film set, wherein the optical film set is fixed to the binding portion or a side of the second bending portion away from the first bending portion by the adhesive.

According to an embodiment of the present disclosure, the backlight module further comprises a second circuit board and a plurality of light sources, and the second circuit board is disposed at a side of a bottom of the middle frame adjacent to the second substrate, wherein the plurality of light sources are disposed on the second circuit board with intervals.

According to an embodiment of the present disclosure, the first substrate is a color filter substrate, and the second substrate is an array substrate.

An embodiment of the present disclosure further comprises a fabricating method of a display device, comprising:
- a step S10 of: providing a liquid crystal display module comprising a first substrate, a second substrate, and a backlight module, wherein the first substrate comprises a first display portion and a first bending portion, and the second substrate comprises a second display portion, a second bending portion, and a binding portion;
- a step S20 of: connecting the first circuit board with the binding portion by a packaging unit; and
- a step S30 of: bending the first bending portion, the second bending portion, and the binding portion toward a direction of the backlight module and extending the first bending portion, the second bending portion, and the binding portion to the backlight module, wherein the first circuit board is bent into a receiving space formed by the middle frame and the outer frame of the backlight module.

According to an embodiment of the present disclosure, the first bending portion is disposed around the first display portion, the second bending portion is disposed around the second display portion, the binding portion is disposed on a side of the second bending portion away from the second display portion, and an edge of the binding portion exceeds an edge of the first bending portion.

According to an embodiment of the present disclosure, in the step S30, a process of bending the first bending portion, the second bending portion, and the binding portion is a hot bending process.

Beneficial effects of the present disclosure are that: an embodiment of the present disclosure is to connect the first circuit board to the binding portion through the packaging unit; to bend the first bending portion, the second bending portion, and the binding portion toward a direction of the backlight module; and to extend the first bending portion, the second bending portion, and the binding portion to the backlight module. In this way, the frame portion that does not realize the display function is bent to a side of the liquid crystal display module or the display device, thereby improving a screen ratio of the display device and realizing a display effect of the full screen display.

DESCRIPTION OF DRAWINGS

In order to more clearly describe embodiments of the present disclosure or technical solutions in a conventional technology, drawings required to be used for the embodiments or descriptions of the conventional technology are simply described hereinafter. Apparently, the drawings described below only illustrate some embodiments of the present disclosure. Those skilled in the art can obtain other drawings based on these drawings disclosed herein without creative effort.

FIG. 5 is a schematic structural diagram of a splicing screen display device according to an embodiment of the present disclosure; AND FIG. 6 is a schematic flowchart of a fabricating method according to an embodiment of the present disclosure.

DETAILED DESCRIPTION OF PREFERRED EMBODIMENTS

Figure 1:
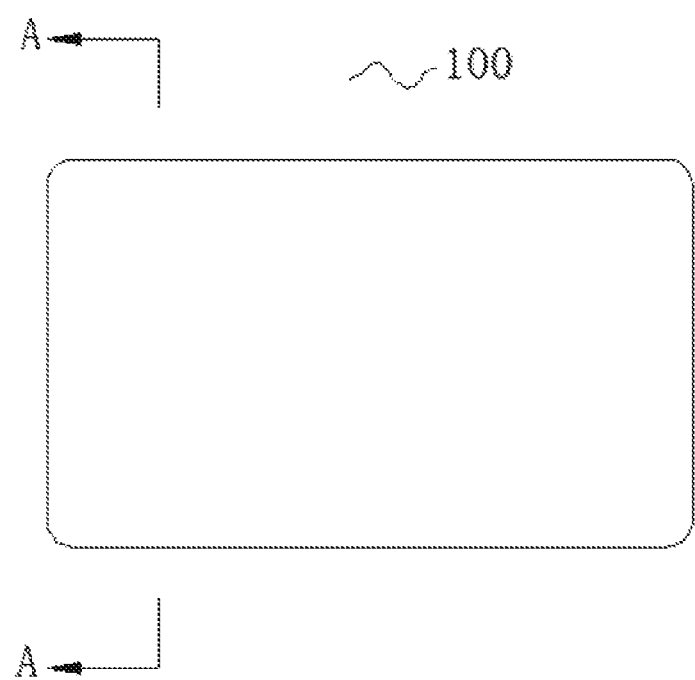
FIG. 1 is a front view of a liquid crystal display module according to an embodiment of the present disclosure.

The following description of each of the embodiments is intended to be illustrative of the specific embodiments. Directional terms mentioned in the present disclosure, such as "upper", "lower", "front", "back", "left", "right", "top", "bottom", etc., are only directions by referring to the accompanying drawings. Thus, the used directional terms are used to describe and understand the present disclosure rather than limiting the present disclosure. In the figures, structurally similar elements are denoted by the same reference numerals.

The present disclosure will be further described below in conjunction with the accompanying drawings and specific embodiments.

An embodiment of the present disclosure provides a liquid crystal display module, which is described in detail below with reference to FIGS. 1 to 4.

Figure 2:
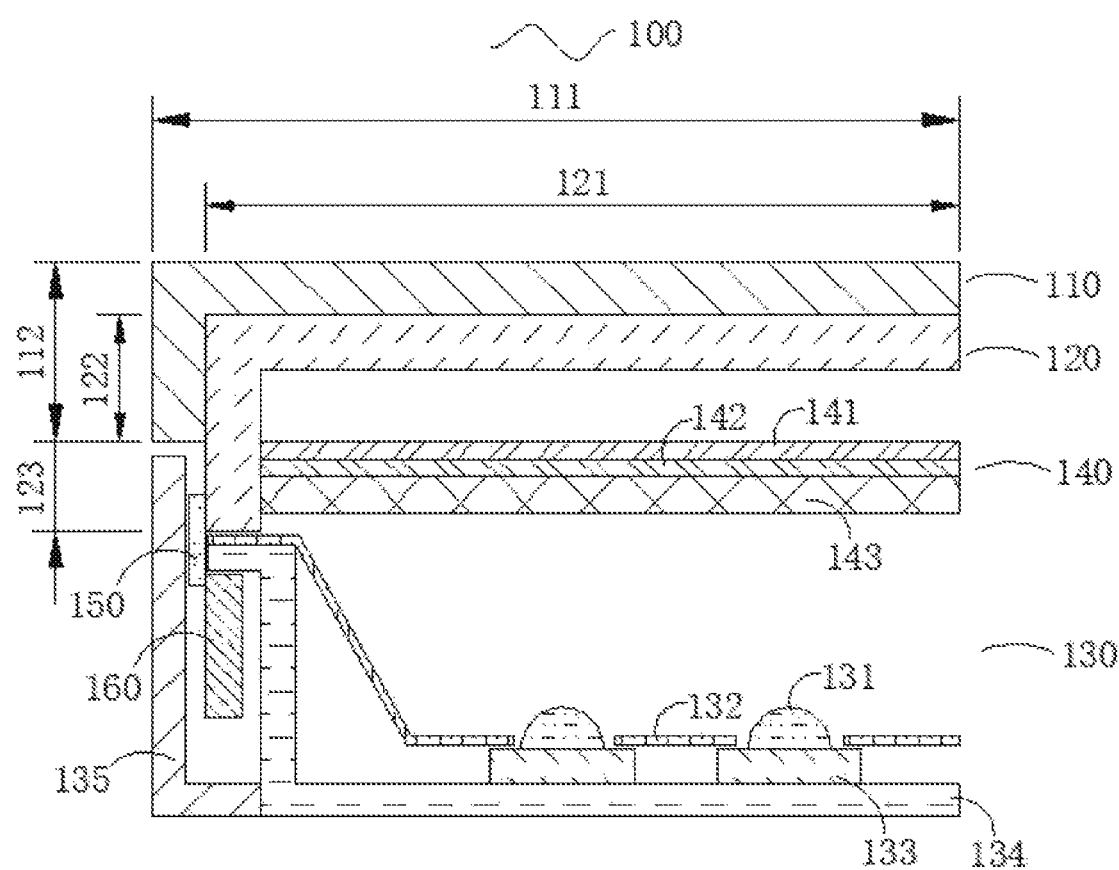
FIG. 2 is a schematic cross-sectional view of a liquid crystal display module along an A-A direction according to an embodiment of the present disclosure.

FIG. 1 is a front view of a liquid crystal display module 100 according to an embodiment of the present disclosure. FIG. 2 is a schematic cross-sectional view of a liquid crystal display module 100 along an A-A direction according to an embodiment of the present disclosure. The liquid crystal display module 100 comprises a first substrate 110, a second substrate 120, and a backlight module 130. The first substrate 110 comprises a first display portion 111 and a first bending portion 112 disposed around the first display portion. The second substrate 120 comprises a second display portion 121, a second bending portion 122 disposed around the second display portion 121, and a binding portion 123 disposed on a side of the second bending portion 122 away from the second display portion 121, wherein an edge of the binding portion 123 exceeds an edge of the first bending portion 112. The second display portion 121 corresponds to the first display portion 111, and the second bending portion 112 corresponds to the second bending portion 122.

Figure 3:
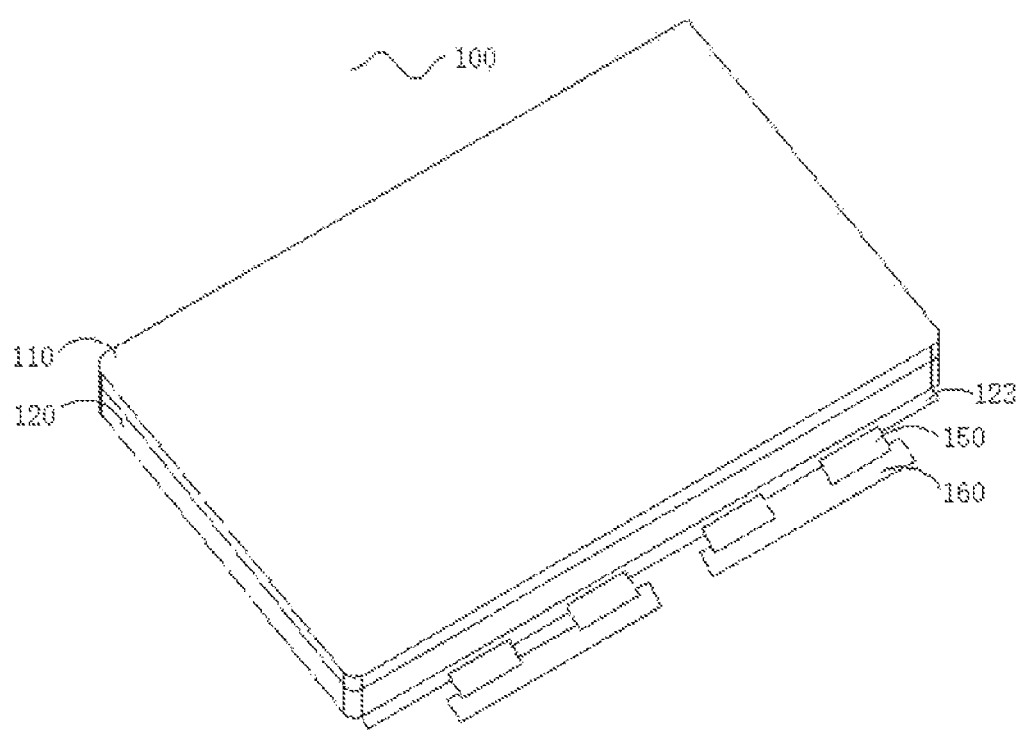
FIG. 3 is a schematic view of a bending structure of a liquid crystal display module according to an embodiment of the present disclosure.

In the present embodiment, the liquid crystal display module 100 further comprises a packaging unit 150 and a first circuit board 160. As shown in FIG. 3, FIG. 3 is a schematic view of a bending structure of a liquid crystal display module according to an embodiment of the present disclosure. The first circuit board 160 is connected to the binding portion 123 by the packaging unit 150.

Specifically, as shown in FIG. 2, the first bending portion 112, the second bending portion 122, and the binding portion 123 are bent toward a direction of the backlight module 130 and extend to the backlight module 130.

In the present embodiment, the first bending portion 112 and the second bending portion 122 are bent to a side, but still have a same display function as the first display portion 111 and the second display portion 121 at the same time. In some embodiments, the first bending portion 112 and the second bending portion 122 may also have no display function.

Figure 4:
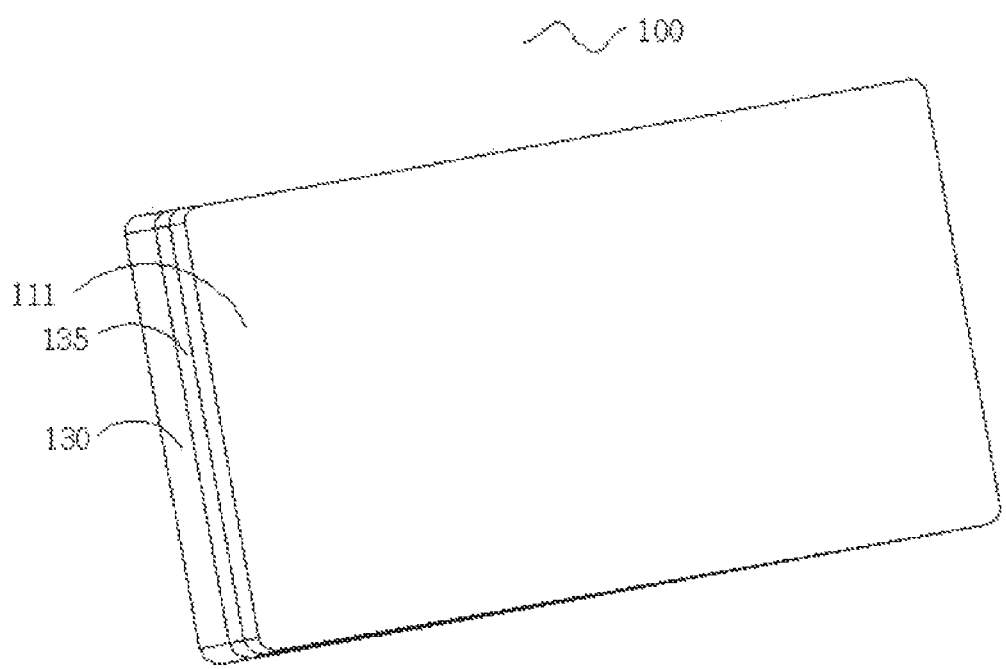
FIG. 4 is an axonometric view of a liquid crystal display module according to an embodiment of the present disclosure.

In the present embodiment, the backlight module 130 comprises a middle frame 134 and an outer frame 135, wherein the middle frame 134 and the outer frame 135 form a receiving space, and the first circuit board 160 is bent into the receiving space, thereby forming a liquid crystal display module 100 with a full screen display function, as shown in FIG. 4.

The liquid crystal display module 100 is viewed from the outside, and the outer frame 135 covers the binding portion 123 of the second substrate 110, the package unit 150, and the first circuit board 160 in the interior of the liquid crystal display module 100. Further, the outer frame 135, the backlight module 130, the first substrate 110, and the second substrate 120 together form a complete liquid crystal display module 100. When viewed from the front, the liquid crystal display module 100 can only see the first display portion 111 as shown in FIG. 4.

In the present embodiment, the backlight module 130 further comprises a diffusion sheet 143, a prism sheet 142, and a brightness enhancement film 141. The brightness enhancement film 141 is disposed on a side of the diffusion sheet 143 adjacent to the second substrate 120, and the prism sheet 142 is disposed between the diffusion sheet 143 and the brightness enhancement film 141.

Specifically, the backlight module 130 further comprises an adhesive, and the diffusion sheet 143, the prism sheet 142, and the brightness enhancement film 141 constitute an optical film set 140, wherein the optical film set 140 is fixed to the binding portion 123 or a side of the second bending portion 122 away from the first bending portion 112 by the adhesive. By fixing the optical film set 140 on a glass substrate of the first substrate 120, a space occupied by the backlight module 130 is reduced, thereby reducing a thickness of the backlight module 100. In some embodiments, the optical film set 140 can also be disposed on the middle frame 134 of the backlight module 130.

Preferably, the optical film set 140 is not limited to the diffusion sheet 143, the prism sheet 142, and the brightness enhancement film 141. In some embodiments, the optical film set 140 may further include a diffusion plate or a light shielding sheet.

In the present embodiment, the backlight module 130 further comprises a second circuit board 133 and a plurality of light sources 131, and the second circuit board 133 is disposed at a side of a bottom of the middle frame 134 adjacent to the second substrate 120, wherein the plurality of light sources 131 are disposed on the second circuit board 133 with intervals.

Preferably, the backlight module 130 further includes a retroreflective sheet 132 disposed on the middle frame 134 and covering the middle frame 134 and the second circuit board 133 to leak out the light sources 131. The retroreflective sheet 132 is used to reflect the light emitted by the light sources 131 to the optical film set 140, thereby increasing a light utilization efficiency of the backlight module 130.

In the present embodiment, the first substrate 110 is a color filter substrate, and the second substrate 120 is an array substrate.

An embodiment of the present disclosure is to connect the first circuit board 160 to the binding portion 123 through the packaging unit 150; to bend the first bending portion 112, the second bending portion 122, and the binding portion 1123 toward a direction of the backlight module; and to extend the first bending portion 112, the second bending portion 122, and the binding portion 123 to the backlight module 130. In this way, the frame portion that does not realize the display function is bent to a side of the liquid crystal display module or the display device, thereby improving a screen ratio of the display device and realizing a display effect of the full screen display, as shown in FIG. 1.

An embodiment of the present disclosure further provides a display device, which is described in detail below with reference to FIGS. 1 to 4.

The display device provided by the present disclosure includes a liquid crystal display module 100, as shown in FIG. 1. FIG. 1 is a front view of a liquid crystal display module 100 according to an embodiment of the present disclosure. FIG. 2 is a schematic cross-sectional view of a liquid crystal display module 100 along an A-A direction according to an embodiment of the present disclosure. The liquid crystal display module 100 comprises a first substrate 110, a second substrate 120, and a backlight module 130. The first substrate 110 comprises a first display portion 111 and a first bending portion 112 disposed around the first display portion. The second substrate 120 comprises a second display portion 121, a second bending portion 122 disposed around the second display portion 121, and a binding portion 123 disposed on a side of the second bending portion 122 away from the second display portion 121, wherein an edge of the binding portion 123 exceeds an edge of the first bending portion 112. The second display portion 121 corresponds to the first display portion 111, and the second bending portion 112 corresponds to the second bending portion 122.

In the present embodiment, the liquid crystal display module 100 further comprises a packaging unit 150 and a first circuit board 160. As shown in FIG. 3, FIG. 3 is a schematic view of a bending structure of a liquid crystal display module according to an embodiment of the present disclosure. The first circuit board 160 is connected to the binding portion 123 by the packaging unit 150.

Specifically, as shown in FIG. 2, the first bending portion 112, the second bending portion 122, and the binding portion 123 are bent toward a direction of the backlight module 130 and extend to the backlight module 130.

In the present embodiment, the first bending portion 112 and the second bending portion 122 are bent to a side, but still have a same display function as the first display portion 111 and the second display portion 121 at the same time. In some embodiments, the first bending portion 112 and the second bending portion 122 may also have no display function.

In the present embodiment, the backlight module 130 comprises a middle frame 134 and an outer frame 135, wherein the middle frame 134 and the outer frame 135 form a receiving space, and the first circuit board 160 is bent into the receiving space, thereby forming a liquid crystal display module 100 with a full screen display function, as shown in FIG. 4.

The liquid crystal display module 100 is viewed from the outside, and the outer frame 135 covers the binding portion 123 of the second substrate 110, the package unit 150, and the first circuit board 160 in the interior of the liquid crystal display module 100. Further, the outer frame 135, the backlight module 130, the first substrate 110, and the second substrate 120 together form a complete liquid crystal display module 100. When viewed from the front, the liquid crystal display module 100 can only see the first display portion 111 as shown in FIG. 4.

In the present embodiment, the backlight module 130 further comprises a diffusion sheet 143, a prism sheet 142, and a brightness enhancement film 141. The brightness enhancement film 141 is disposed on a side of the diffusion sheet 143 adjacent to the second substrate 120, and the prism sheet 142 is disposed between the diffusion sheet 143 and the brightness enhancement film 141.

Specifically, the backlight module 130 further comprises an adhesive, and the diffusion sheet 143, the prism sheet 142, and the brightness enhancement film 141 constitute an optical film set 140, wherein the optical film set 140 is fixed to the binding portion 123 or a side of the second bending portion 122 away from the first bending portion 112 by the adhesive. By fixing the optical film set 140 on a glass substrate of the first substrate 120, a space occupied by the backlight module 130 is reduced, thereby reducing a thickness of the backlight module 100. In some embodiments, the optical film set 140 can also be disposed on the middle frame 134 of the backlight module 130.

Preferably, the optical film set 140 is not limited to the diffusion sheet 143, the prism sheet 142, and the brightness enhancement film 141. In some embodiments, the optical film set 140 may further include a diffusion plate or a light shielding sheet.

In the present embodiment, the backlight module 130 further comprises a second circuit board 133 and a plurality of light sources 131, and the second circuit board 133 is disposed at a side of a bottom of the middle frame 134 adjacent to the second substrate 120, wherein the plurality of light sources 131 are disposed on the second circuit board 133 with intervals.

Preferably, the backlight module 130 further includes a retroreflective sheet 132 disposed on the middle frame 134 and covering the middle frame 134 and the second circuit board 133 to leak out the light sources 131. The retroreflective sheet 132 is used to reflect the light emitted by the light sources 131 to the optical film set 140, thereby increasing a light utilization efficiency of the backlight module 130.

In the present embodiment, the first substrate 110 is a color filter substrate, and the second substrate 120 is an array substrate.

An embodiment of the present disclosure is to connect the first circuit board 160 to the binding portion 123 through the packaging unit 150; to bend the first bending portion 112, the second bending portion 122, and the binding portion 1123 toward a direction of the backlight module; and to extend the first bending portion 112, the second bending portion 122, and the binding portion 123 to the backlight module 130. In this way, the frame portion that does not realize the display function is bent to a side of the liquid crystal display module or the display device, thereby improving a screen ratio of the display device and realizing a display effect of the full screen display, as shown in FIG. 1.

An embodiment of the present disclosure further provides a splicing screen display device, which is described in detail below with reference to FIG. 5.

As shown in FIG. 5, FIG. 5 is a schematic structural diagram of a splicing screen display device 200 according to an embodiment of the present disclosure. The splicing screen display device 200 includes a plurality of liquid crystal display modules 100 as described in the above embodiments. The plurality of liquid crystal display modules 100 are arranged in a matrix and connected to each other to form a splicing screen display device 200 as shown in FIG. 5. It can be seen from the above embodiments that the liquid crystal display module 100 can realize the display effect of the full screen display. Therefore, the splicing screen display device 200 in the embodiments of the present disclosure can realize the display effect of full screen display of the splicing screen without frames.

An embodiment of the present disclosure further provides a fabricating method of a display device, which is described in detail below with reference to FIGS. 2 and 6.

FIG. 2 is a schematic cross-sectional view of a liquid crystal display module according to an embodiment of the present disclosure. FIG. 6 is a schematic flowchart of a fabricating method according to an embodiment of the present disclosure. The fabricating method comprises following steps.

In step S10, a liquid crystal display module 100 is provided and comprises a first substrate 110, a second substrate 120, and a backlight module 130, wherein the first substrate 110 comprises a first display portion 111 and a first bending portion 112, and the second substrate 120 comprises a second display portion 121, a second bending portion 122, and a binding portion 123.

In step S20, the first circuit board 160 is connected with the binding portion 123 by a packaging unit 150.

In step S30, the first bending portion 112, the second bending portion 122, and the binding portion 123 are bent toward a direction of the backlight module 130 and extend to the backlight module 130, wherein the first circuit board 160 is bent into a receiving space formed by the middle frame 134 and the outer frame 135 of the backlight module 130.

In the present embodiment, the first bending portion 112 is disposed around the first display portion 111, the second bending portion 122 is disposed around the second display portion 121, the binding portion 123 is disposed on a side of the second bending portion 122 away from the second display portion 121, and an edge of the binding portion 123 exceeds an edge of the first bending portion 112.

In the present embodiment, in the step S30, a process of bending the first bending portion 112, the second bending portion 122, and the binding portion 123 is a hot bending process.

In some embodiments, when material of the first substrate 110 and the second substrate 120 are flexible substrates, the first substrate 110 and the second substrate 120 may also be bent by other bending processes.

An embodiment of the present disclosure is to connect the first circuit board 160 to the binding portion 123 through the packaging unit 150; to bend the first bending portion 112, the second bending portion 122, and the binding portion 1123 toward a direction of the backlight module; and to extend the first bending portion 112, the second bending portion 122, and the binding portion 123 to the backlight module 130. In this way, the frame portion that does not realize the display function is bent to a side of the liquid crystal display module or the display device, thereby improving a screen ratio of the display device and realizing a display effect of the full screen display.

As described above, although the present disclosure has been disclosed in the preferred embodiments as above, the above preferred embodiments are not intended to limit the present disclosure. Those skilled in the art can make various changes and modifications without departing from the spirit and scope of the present disclosure. Therefore, the protection scope of the present disclosure is defined by the scope of the claims.

The invention claimed is:

1. A liquid crystal module, comprising:
   a first substrate comprising a first display portion and a first bending portion disposed around the first display portion;
   a second substrate comprising a second display portion, a second bending portion disposed around the second display portion, and a binding portion disposed on a side of the second bending portion away from the second display portion, wherein an edge of the binding portion exceeds an edge of the first bending portion;
   a packaging unit;
   a first circuit board connected to the binding portion by the packaging unit; and
   a backlight module,
   wherein the first bending portion, the second bending portion, and the binding portion are bent toward a direction of the backlight module and extend to the backlight module.

2. The liquid crystal module according to claim 1, wherein the backlight module comprises a middle frame and an outer frame, wherein the middle frame and the outer frame form a receiving space, and the first circuit board is bent into the receiving space.

3. The liquid crystal module according to claim 2, wherein the backlight module further comprises a diffusion sheet, a prism sheet, and a brightness enhancement film, wherein the brightness enhancement film is disposed on a side of the diffusion sheet adjacent to the second substrate, and the prism sheet is disposed between the diffusion sheet and the brightness enhancement film.

4. The liquid crystal module according to claim 3, wherein the backlight module further comprises an adhesive, and the diffusion sheet, the prism sheet, and the brightness enhancement film constitute an optical film set, wherein the optical film set is fixed to the binding portion or a side of the second bending portion away from the first bending portion by the adhesive.

5. The liquid crystal module according to claim 4, wherein the backlight module further comprises a second circuit board and a plurality of light sources, and the second circuit board is disposed at a side of a bottom of the middle frame adjacent to the second substrate, wherein the plurality of light sources are disposed on the second circuit board with intervals.

6. The liquid crystal module according to claim 1, wherein the first substrate is a color filter substrate, and the second substrate is an array substrate.

7. A display device, comprising: a liquid crystal display module comprising:
   a first substrate comprising a first display portion and a first bending portion disposed around the first display portion;
   a second substrate comprising a second display portion, a second bending portion disposed around the second display portion, and a binding portion disposed on a side of the second bending portion away from the second display portion, wherein an edge of the binding portion exceeds an edge of the first bending portion;
   a packaging unit;
   a first circuit board connected to the binding portion by the packaging unit; and
   a backlight module,
   wherein the first bending portion, the second bending portion, and the binding portion are bent toward a direction of the backlight module and extend to the backlight module.

8. The display device according to claim 7, wherein the backlight module comprises a middle frame and an outer frame, wherein the middle frame and the outer frame form a receiving space, and the first circuit board is bent into the receiving space.

9. The display device according to claim 8, wherein the backlight module further comprises a diffusion sheet, a prism sheet, and a brightness enhancement film, wherein the brightness enhancement film is disposed on the diffusion sheet near a side of the second substrate, and the prism sheet is disposed between the diffusion sheet and the brightness enhancement film.

10. The display device according to claim 9, wherein the backlight module further comprises an adhesive, and the diffusion sheet, the prism sheet, and the brightness enhancement film constitute an optical film set, wherein the optical film set is fixed to the binding portion or a side of the second bending portion away from the first bending portion by the adhesive.

11. The display device according to claim 10, wherein the backlight module further comprises a second circuit board and a plurality of light sources, and the second circuit board is disposed at a side of a bottom of the middle frame near the second substrate, wherein the plurality of light sources are disposed on the second circuit board with intervals.

12. The display device according to claim 7, wherein the first substrate is a color filter substrate, and the second substrate is an array substrate.

13. A fabricating method of a display device, comprising:
   a step S10 of: providing a liquid crystal display module comprising a first substrate, a second substrate, and a backlight module, wherein the first substrate comprises a first display portion and a first bending portion, and the second substrate comprises a second display portion, a second bending portion, and a binding portion;
   a step S20 of: connecting the first circuit board with the binding portion by a packaging unit; and
   a step S30 of: bending the first bending portion, the second bending portion, and the binding portion toward a direction of the backlight module and extending the first bending portion, the second bending portion, and the binding portion to the backlight module, wherein the first circuit board is bent into a receiving space formed by the middle frame and the outer frame of the backlight module.

14. The fabricating method according to claim 13, wherein the first bending portion is disposed around the first display portion, the second bending portion is disposed around the second display portion, the binding portion is disposed on a side of the second bending portion away from the second display portion, and an edge of the binding portion exceeds an edge of the first bending portion.

15. The fabricating method according to claim 13, wherein in the step S30, a process of bending the first bending portion, the second bending portion, and the binding portion is a hot bending process.

* * * * *